United States Patent Office 2,905,520
Patented Sept. 22, 1959

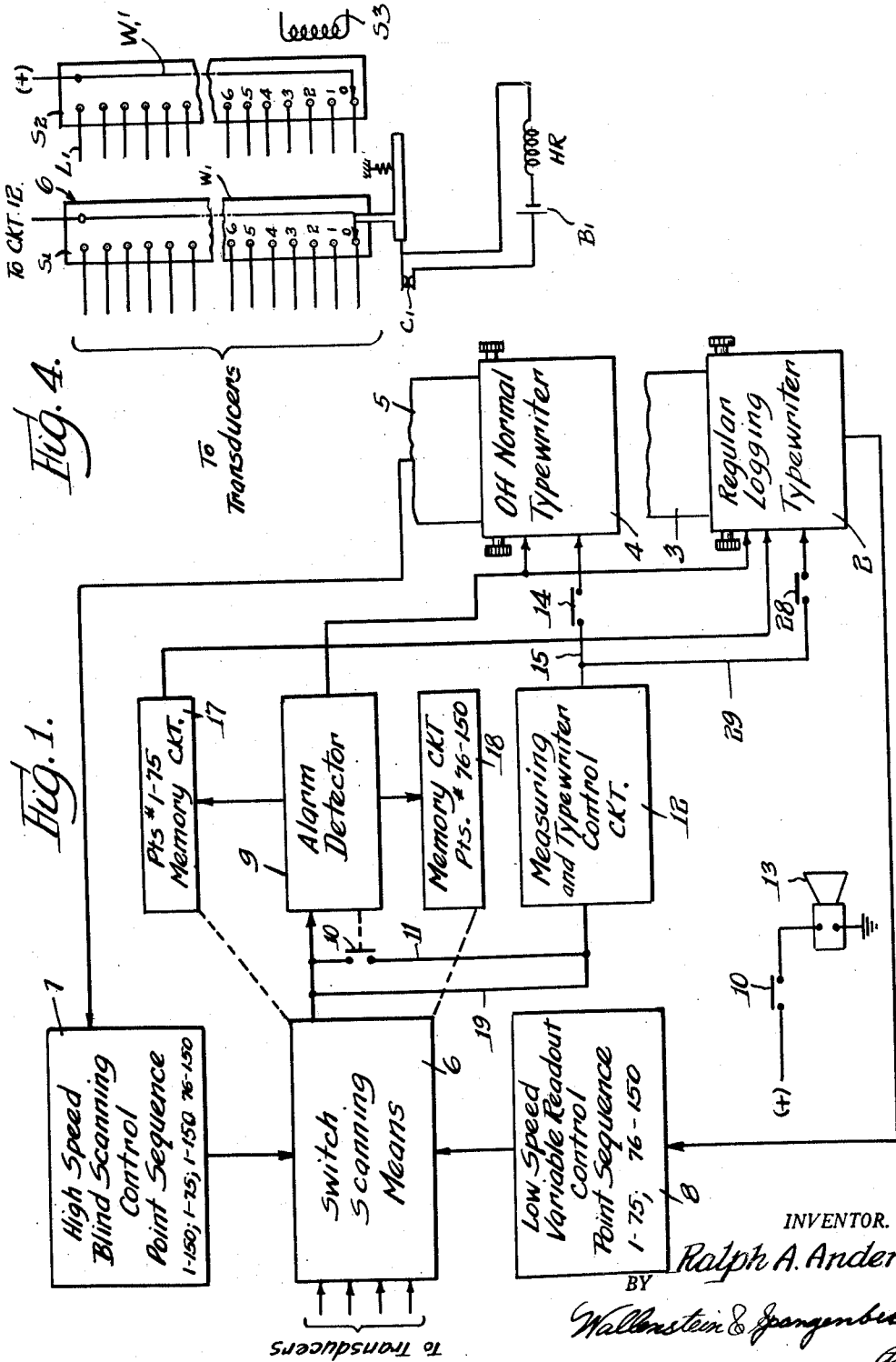

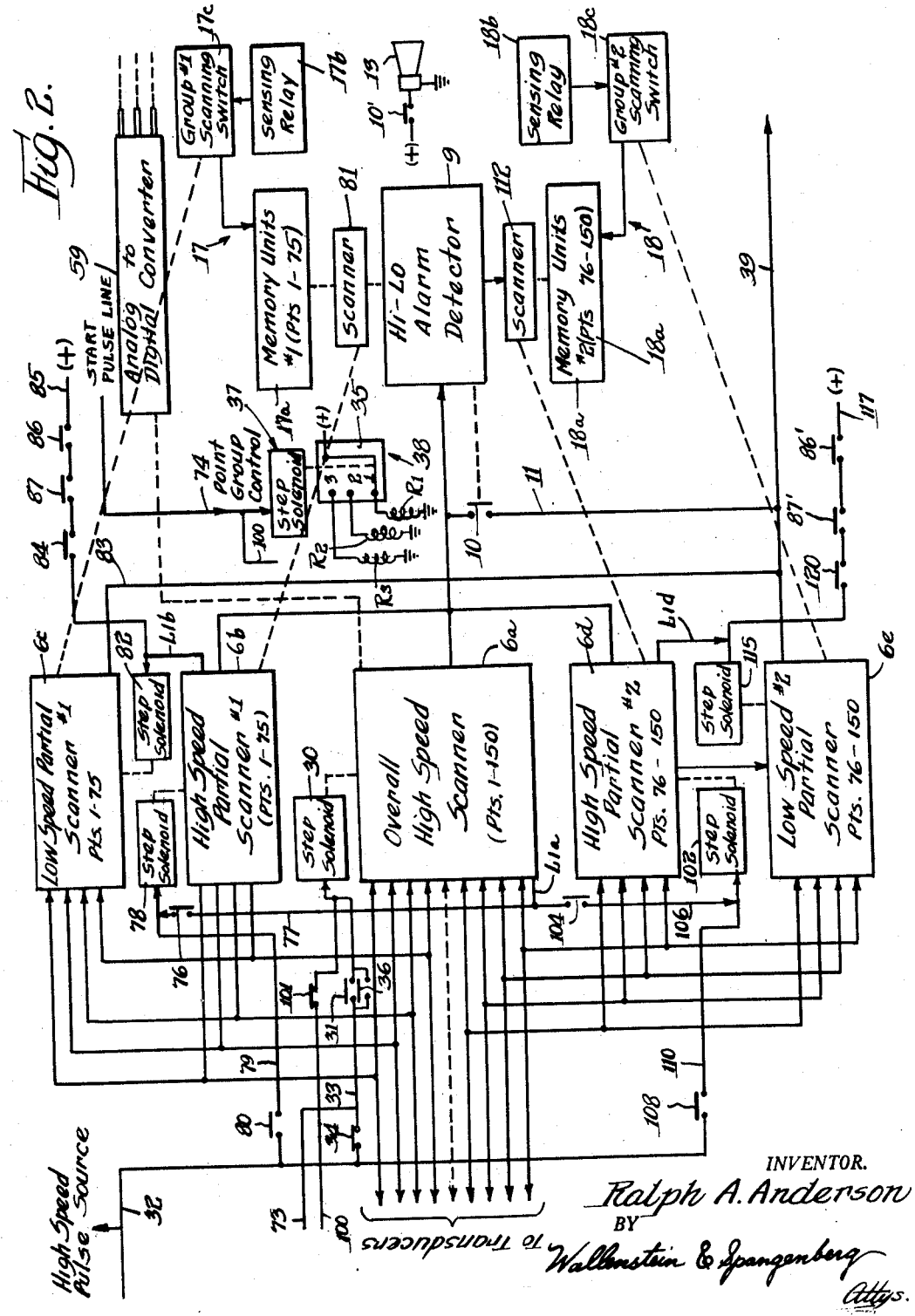

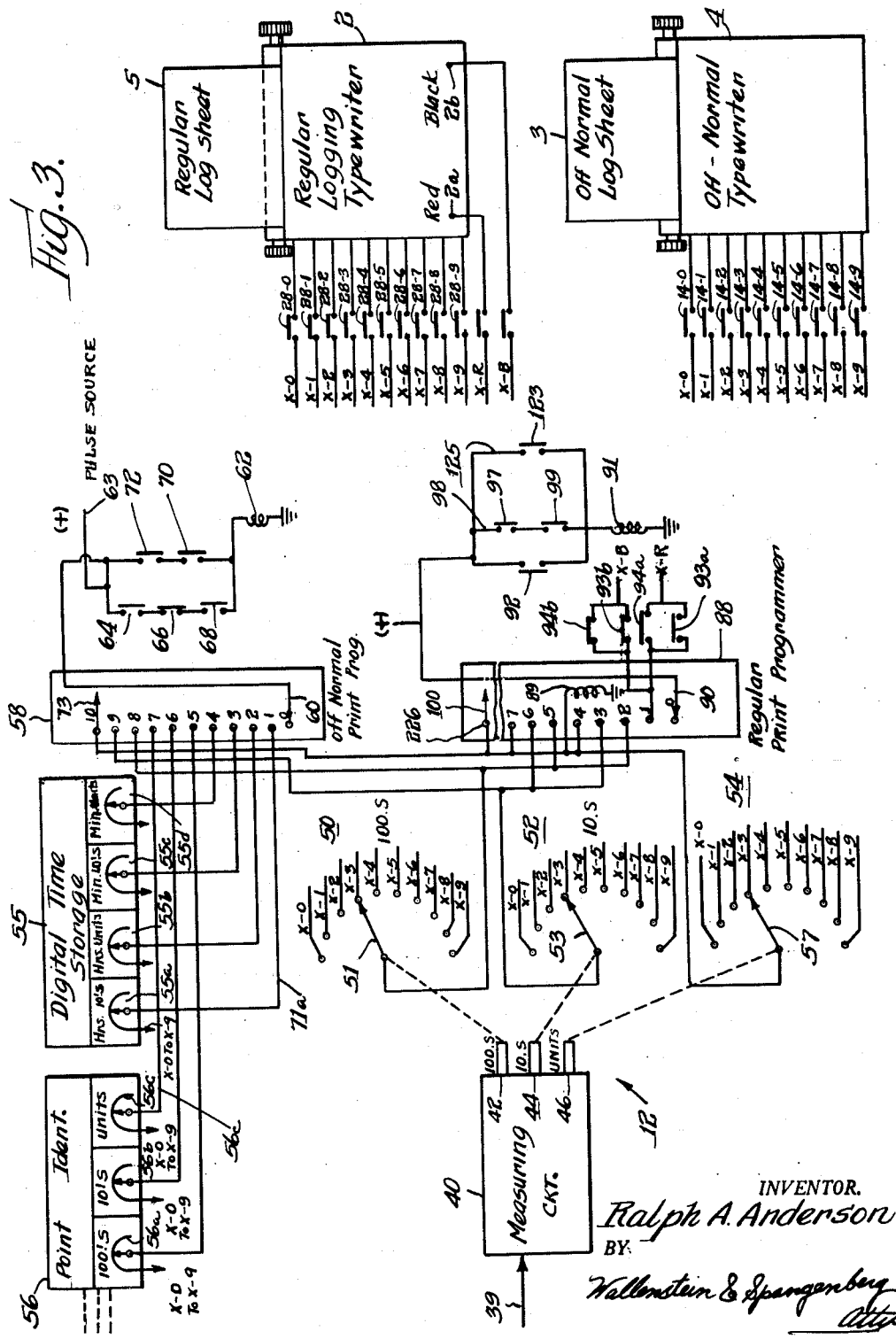

2,905,520

DATA RECORDING SYSTEM

Ralph A. Anderson, Deerfield, Ill., assignor, by mesne assignments, to Information Systems, Inc., Skokie, Ill., a corporation of Illinois Application June 22, 1956, Serial No. 593,287

13 Claims. (Cl. 346—34)

This invention relates to an automatic data recording system of the type wherein the outputs of a number of primary measuring devices, which may be thermo-couples, bellows-operated potentiometers or rheostats, or other transducer devices providing electrical outputs which are a function of the value of the associated variables, are scanned by a common measuring and recording system which sequentially records on a record sheet the actual numerical values of all the variables using preferably an electric typewriter as the recording element. Such a system is described in my U.S. Patent No. 2,701,748 granted February 8, 1955.

In one form of such a system heretofore utilized, abnormal data was printed on the record sheet in red or other distinguishing color from the normal printed data and an audible alarm was sounded whenever an abnormal variable was scanned. To enable the recording system to be selectively responsive to normal and abnormal data, an alarm detecting apparatus was included in the system which compared the output of the primary measuring devices with predetermined voltage standards representing the normal expected limits of the variables involved. Alarm detecting and recording operations were simultaneously carried out. This presented problems of preventing undesired coupling of electrical signals used to operate the typewriter through adjacent wires to the sensitive alarm detecting apparatus creating false alarms.

In such a system all the variables were periodically, for example, hourly, scanned and recorded once at a relatively slow scanning rate to give the measuring and recording apparatus time to operate. As each primary measuring device was scanned, the measuring device, usually a self-balancing potentiometer circuit, responded to the outputs thereof, and, when a balanced condition in the system was reached, the typewriter printed the numerical value of the data of the variable involved. It can be appreciated that where a scanning cycle is utilized involving 150 or more variables, the sum total of 150 or more time intervals required to operate the balancing circuit and the typewriter amounts to several minutes. Thus, several minutes elapse between the successive scanning of any particular variable, and during this time the condition of a variable may change from a normal to an abnormal state without early warning being given thereof.

Accordingly, one of the objects of this invention is to provide a data recording system of the type which sequentially scans and records data on a number of variables wherein alarm-detecting and data measuring and recording operations are separated in point of time so that operation of the measuring and recording apparatus will not affect the alarm detecting apparatus.

Another object of this invention is to provide a data recording system of the general type above described wherein the time interval between successive scannings of the variables during regular recording of all variables is substantially reduced from that heretofore obtained.

Still another object of this invention is to provide a data recording system which satisfies both of the aforementioned objects.

Briefly, in one aspect of the invention, a number of variables are initially scanned at a high rate while the conditions of the scanned variables are memorized in suitable well-known storage or memory means. Following a high speed alarm detection operation, the variables are re-scanned at a slower rate where measuring and recording of the values of the variables are carried out. Abnormal and normal printed data are given a distinguishing characteristic as determined by the information stored in the memory means. In this way, alarm detecting and data recording operations are carried out separately thereby increasing the reliability of the alarm detecting features of the system.

In accordance with another aspect of the invention, the time interval between successive alarm scannings of the variables is reduced substantially by utilizing a scanning cycle wherein the measuring and recording operations are periodically interrupted before completion of the recording of all variables and all variables are then scanned for abnormal conditions at a high scanning rate. Whenever an abnormal variable is scanned, the scanning apparatus is momentarily stopped and the value of the abnormal variable is immediately recorded, either by the same typewriter which prints out the values of all of the variables just previously scanned, but on a different portion of the record sheet, or else by a second typewriter which prints the data on a separate record sheet. All abnormal data is thus grouped together where it can be quickly and easily analyzed. Following recording of such data, the high speed alarm-scanning operation continues until the last variable is scanned, whereupon the system then measures and records data of all variables in a second limited group of variables following which the over-all high speed alarm scanning operation is repeated.

In the preferred form of the invention, the measuring and recording operation of the limited groups of variables includes the two types of scanning operations previously mentioned, one being a high speed scanning of the limited group of variables where the conditions of the variables are memorized as above outlined and following which the same limited number of variables are re-scanned more slowly where they are measured and recorded with distinguishing characteristics. In this way alarm detecting and recording operations are separated for the reasons given above.

Other objects, advantages, and features of the invention will become apparent upon making reference to the specification and claims to follow, taken in conjunction with the drawings wherein:

Fig. 1 is a simplified box diagram of a data recording system including features of the invention;

Fig. 2 is a detailed box diagram of a part of the data recording system of the invention;

Fig. 3 is a detailed box diagram of the remainder of the data recording system shown in Fig. 2; and Fig. 4 is a diagrammatic view of a two-level step switch and associated circuitry.

Refer now more particularly to the simplified box diagram of Fig. 1. In this system, there is provided an automatic electric typewriter 2 for recording on a record sheet 3 the periodically or regularly scanned variables, and a typewriter 4 for printing on a record sheet 5 data on abnormal variable scanned between the measuring and recording operations resulting in the data on record sheet 3. Although utilizing separate typewriters has certain advantages over the use of a single typewriter for the purposes of this invention, it should be understood that a single typewriter utilizing a line spacing program similar to that disclosed in my U.S. Patent No. 2,701,748 may be used within the spirit of the broader aspects of the invention.

The outputs of the various primary measuring devices, referred to as transducers in Fig. 1, are connected to the input of a scanning switch means 6 which may comprise one or more telephone-type stepping switches. The construction of such stepping switches and the techniques for controlling the same are so well-known in the control field that the detailed disclosure of their construction and operation need not be described herein. However, the manner in which the various stepping switches making up the preferred form of scanning switch means are related to each other will be described hereafter. Suffice it to say at this point, the scanning switch means 6 is controlled by high speed scanning control apparatus generally indicated by the box 7 in Fig. 1 and a low speed variable read-out control apparatus generally indicated by the box 8 in Fig. 1. These control apparatuses are such that the scanning switch means will follow a program wherein initially all variables will be scanned at a high rate following which a first limited group of variables from the same overall group of variables will be scanned again at a high rate where alarm detecting and memorizing operations are performed whereupon the first group will again be scanned at a low rate. Then all variables will be again scanned at a high rate following which another limited group of variables will be again scanned at a high rate and then the same second group of variables will be scanned at a low rate where the aforementioned alarm detecting and recording operations are performed. If only two limited groups of variables are involved, then the aforementioned overall high speed alarm scanning cycle is repeated until the time for the next regular recording of all variables arrives.

Purely for purposes of illustration, it will be assumed that there are 150 variables in all to be monitored and recorded, and that only two limited groups of variables will be involved, namely variables number 1 through 75 and number 76 through 150. Thus, in the above example, initially points 1 through 150 will be scanned at the high rate wherein the system will be looking for abnormal variables only. When an abnormal variable is scanned, the scanning momentarily ceases until the value of the abnormal variable is measured and recorded. Also an audible alarm will be sounded to attract an operator's attention. Following this, variables number 1 through 75 will be scanned at a high rate with the system again looking for abnormal variables and storing information on the same. Following this, variables 1 through 75 will be scanned at a low rate to enable measuring and recording operations to be performed with the abnormal data printed in one color, as red and the normal data in black. Then, all variables 1 through 150 will again be scanned at the high rate while the system looks for abnormal variables. Following this, variables 76 through 150 will again be scanned at a high rate while the system looks for abnormal variables and memorizes the same. The latter group of variables will then be scanned at a slow rate while they are measured and recorded.

Now referring to Fig. 1, during the overall high speed scanning of the variables, the output of the scanning switch means is fed normally only to the input of the alarm detector 9. When an abnormal variable is scanned, the alarm detector 9 will initiate an operation which temporarily stops the advancement of scanning switch means 6 and operates the set of alarm contacts 10 in a branch line 11 which contacts close to couple the output of the scanning switch means to the input of a measuring and typewriter control circuit 12. Operation of the alarm detector 9 also closes a set of alarm contacts 10' which causes the sounding of an audible alarm 13. The control circuit 12 feeds suitable signals to the typewriter 4 through closed contacts 14 in a branch line 15 to print the numerical value of the variable scanned on record sheet 5. This data preferably includes the time, an identification of the variable scanned, and the numerical value of the variable. The contacts 14 are closed during the overall high speed scanning cycle. Following recording of this data, advancement of the scanning switch means 6 resumes and the just mentioned scanning operation continues until all variables are scanned. Obviously, if none of the variables are abnormal, the typewriter 4 will not be operated during the high speed scanning interval now being described.

Preferably, the high speed scanning cycle just described continues until the time is reached when recording of data on all of the variables is desired. This, for example, may occur hourly, and between these regular hourly recording intervals, the system scans all variables for abnormal data and records on record sheet 5 all such data detected during this time period. When the time for regular recording arrives, the scanning switch means 6 is allowed to finish the particular cycle involved whereupon the scanning switch means scans again at a high rate variables, sometimes referred to as points, 1 through 75. The output of the scanning switch means is again fed to the alarm detector 9. Associated with each variable is any well-known storage element or circuit. These storage means may take any one of a number of forms, such as a relay, a capacitor, etc. The storage elements associated with variables numbers 1 through 75 form part of a memory circuit referred to in Fig. 1 by a box 17. By means of a scanning switch level operated and forming part of the scanning switch means 6, the alarm detector 9 is successively brought into association with the various storage or memory elements, and abnormal conditions of the variables are stored in the circuits associated with the abnormal variables. Where the storage units are relays, the relay may be energized when the alarm detector 9 senses an abnormal variable. If it is a capacitor, the capacitor may be charged if the associated variable is abnormal. One type of memory circuit which may be utilized, is described in my co-pending application Serial No. 470,859, filed November 24, 1954 on an Automatic Process Logging System.

Following the high speed scanning of variables 1 through 75, these same variables are again scanned at a slow rate. At this time, the output of the scanning switch means is fed to the measuring and typewriter control circuit 12 through a branch 19 and abnormal data is preferably printed in red under control of the memory circuit 17 while normal data is printed in black. This circuit may take any number of well-known forms, for example it may include a self-balancing potentiometer unit, a device for converting the analogue or shaft output of the balancing unit to a digital output and suitable means for sequentially feeding control information to the regular logging typewriter 2 through contacts 28 in a branch 29 leading from the output of the control circuit 12. In one existing form of data recording system, the record sheet 3 contains space for data on 75 variables so that in the example illustrated, the typewriter 2 will print numerical data in 75 columns on the sheet corresponding to the variables numbers 1 through 75. Of course, the present invention is equally applicable to a situation where less than 75 variables are involved, say 25 variables per group, and in such case, the typewriter 2 will cease printing after recording across only one-third of the record sheet 3.

Following the recording of the first group of variables, the scanning switch means 6 is again operated at a high rate where it scans all of the variables, 1 through 150, looking for abnormal data. Again, when an abnormal variable is detected, the advancement of the scanning switch means 6 is terminated, alarm switch 10 closes, and the output of the scanning switch means is fed to the measuring and typewriter control circuit 12 which feeds control signals to the off-normal typewriter 4 in the general manner above described. Then, variables number 76 through 150 are re-scanned at a high rate by the scanning switch means 6 and the alarm detector 9 is sequentially connected to storage elements associated with the respective variables of this second group forming part of the memory circuit generally indicated by reference numeral 18 to store information on abnormal variables. Following this, variables 76 through 150 are scanned at a slow rate while the output of the scanning switch means is fed to the measuring and typewriter control circuit 12 over branch 19. The latter circuit feeds control signals through the then closed switch 28 in branch 29 to the typewriter 2 where data on variables 76 through 150 is recorded. When the memory circuit 18 indicates that the variable scanned was previously abnormal, control signals are fed to typewriter 2 to effect printing of such variable in red. In the above example where the line on the record sheet 3 accommodates 75 variables, typewriter 2 may be automatically line indexed a given number of lines to begin recording of data on the second group of variables in a different area or segment of the record sheet, in a manner described in my aforementioned patent. In the case where the group of variables occupies only part of a line, the typewriter 2 will continue typing data on the second group of variables to the right of the data recorded on the first group of variables. Following the recording of all of the variables on the record sheet 3, the scanning switch means 6 is preferably continuously operated to blind scan for abnormal data until the next hourly or regular recording cycle begins. Data on abnormal variables is again grouped in the record sheet 5 following the procedure above described.

Refer now more particularly to the detailed box diagram shown in Figs. 2 and 3. The scanning switch means there shown includes an over-all high speed scanner 6a which has at least 150 active steps or contact positions in addition to a home position, high speed partial scanners 6b and 6d, respectively, which have 75 active steps or contact positions in addition to a home contact position, and low speed partial scanners 6c and 6e, respectively, which have 75 active contact positions in addition to a home contact position.

In the interest of simplifying the circuit diagrams, the stepping switch circuits are shown primarily in box form. However, Fig. 4 shows schematically a typical step switch circuit which may be used in any one of the scanning switch circuits shown in box form in Fig. 2. Each comprises two or more ganged levels $S_1$ and $S_2$ which are moved together and have the same number of contact positions. Level $S_1$ has a stationary home or zero contact "0" and a number of other contacts which are connected to the transducers. The stationary contacts actually are arranged in a semi-circle and the wipers W1—W1' of the levels have two oppositely extending arms so that as one of the arms leaves the last contact the other arm moves against the home contact in the forward direction of movement thereof. Also, instead of using a step switch level with a large number of contacts, a number of smaller switches can be connected in tandem, in a manner well known in the art. When the wiper W1 of level $S_1$ is in its home position, it closes a set of contacts C1 which are in a circuit including a voltage source B1, and a homing relay HR. The relay HR is thus energized when the wiper W1 is in its home position and de-energized for all other positions of the wiper. The relay HR has contacts which perform control functions to be described.

The other level S may be referred to as a transfer level since it completes a transfer pulse on line L1 as the wiper W1' moves from the last contact thereof to the homing contact "0." This pulse is used to step another scanning switch from its home position. The wipers are moved one step for each complete pulse fed to a step solenoid $S_3$.

Referring again to Figs. 2 and 3, the movement of the over-all high speed scanner 6a is controlled by a solenoid 30 corresponding to solenoid $S_3$ in Fig. 4. The feed line for the solenoid 30 can be traced from the high speed pulse line 32 which is connected to a source of pulses, and through a feed line 33 including a set of alarm contacts 34 controlled by the alarm detector 9, contacts 36 which are controlled by the homing relay HR of the scanner 6a and are closed for every position of the scanner except the home position thereof, and contacts 31 which are in parallel with contacts 36. The contacts 31 are controlled by a point group control programmer 38 which may include a stepping switch 35 controlled by solenoid 37. The stepping switch 35 has three contact positions, one for controlling the regular repeated over-all high speed scanning, a second for controlling recording of variables 1 through 75 and a third position for controlling recording variables 76 through 150. During the interval between regular or hourly scanning cycles, the point group control step switch 35 is in its number 1 contact position for overall high speed scanning. Through suitable means, such as a relay $R_1$ connected to the number one contact, contacts 31 in feed line 33 are closed so that relatively high speed pulses are continuously fed to the solenoid 30. As explained in the simplified embodiment of Fig. 1, during this period, the output of scanner 6a is fed to a suitable high-low alarm detector 9, which is well known in the art.

Whenever an abnormal variable is scanned, that is whenever the variable exceeds the high and low limits set by the detector circuit, a relay (not shown) in the detector circuit 9 operates to open the alarm contacts 34 in the pulse feed line 33 thereby temporarily terminating the pulsation of the solenoid 30 of the scanner 6a and the advancement of the scanner 6a. The alarm detector relay above mentioned also closes alarm contacts 10 in the branch line 11 which couples the output of the scanner 6a to the feed line 39 leading to a suitable measuring circuit 40 (see Fig. 3), which may include a self-balancing potentiometer circuit and a suitable analogue to digital converter mechanism of any type well known in the art. The voltage fed to the measuring circuit from the scanner 6a may be a voltage whose value is proportional to the value of the associated abnormal variable.

The measuring circuit 40 provides a suitable digital output, in the example illustrated, a mechanical output in the form of the degree of angular movement of shafts 42, 44, and 46, which respectively represent the hundreds, tens and units digits of a number representing the value of the variable. These shafts respectively control the position of wipers 51, 53, and 57 of ten position switches 50, 52, and 54, respectively. The corresponding stationary contacts of these switches are connected respectively to lines $x$–0, $x$–1, $x$–2 . . . $x$–9, leading to the ten channel input of the typewriters 2 and 4. Alarm contacts 14–0, 14–1 . . . 14–9 are connected respectively between the lines $x$–0, $x$–1 . . . $x$–9 and the ten channel input to the off-normal typewriter 4. The contacts 14–0 to 14–9 are controlled by the HR relay of scanner 6a and are closed only when the scanner is away from its home position. Energization of one of the typewriter channels will result in the printing of a number corresponding to the number of the contact position of the switch to which it is then connected.

The wiper 51 of the hundreds switch 50 is electrically connected to the number 8 contact of an off-normal print programmer stepping switch 58. The wiper 53 of the tens switch 52 is electrically connected to the number 9 contact of the off-normal print programmer switch 58, and the wiper 57 of the units switch 54 is connected to the number 10 contact of the latter switch. This switch 58 controls the order in which the digit switches 50, 52, and 54 are connected to the typewriters.

As previously described, the information to be printed on the off-normal log sheet 3 includes a first group of numbers representing time, a second group of numbers representing the point or variable identification, and a third group of numbers representing the value of the variables. There is accordingly provided a digital time storage unit 55 which is clock-driven in a well-known manner. The digital time storage unit includes ten position tens and units hours switches 55a and 55b tens and units minutes switches 55c and 55d. Each of these switches includes a wiper arm which is positioned by one of the shaft outputs of a clock in much the same manner that the shaft output of the measuring circuit positions the wipers of the switches 50, 52 and 54, and ten stationary contact positions which are respectively connected to the lines x–0 to x–9 leading to the typewriter inputs. The wipers of the switches 55a, 55b, 55c and 55d are respectively connected to stationary contacts 1, 2, 3 and 4 of the off-normal print programmer switch 58.

To provide point identification, a point identification switch unit 56 is provided having a hundredths ten position switch 56a, a tens ten position switch 56b, and a units ten position switch 56c, respectively coupled to the hundreds, tens and units shaft output of an analogue to digital converter 59 (Fig. 2) driven by the overall high speed scanner switch 6a. The ten stationary contacts of the switches 56a, 56b and 56c are respectively connected to the typewriter input lines x–0 to x–9 and the wipers of these switches are respectively connected to the number 5 and number 6 and the number 7 contact positions of the off-normal print programmer switch 58.

The off-normal print programmer switch 58 has a home position 0. The wiper 60 of the switch is connected to a source of direct current potential. The movement of the wiper 60 is controlled by a step solenoid 62 which has an energization circuit including a first branch leading to a line 63 connected to a source of pulses. This branch includes off-home contacts 64 controlled by the HR relay of the scanner switch 6a which contacts are closed whenever the scanner switch 6a is away from its home or zero position, a set of contacts 66 which are controlled by the HR relay (not shown) of step switch 58 and are closed when the switch 58 is in its home or 0 contact position, and a normally open set of alarm contacts 68 which close when the alarm detector senses an abnormal variable. Thus, as an abnormal variable is detected during the overall scanning period, the closing of alarm contacts 68 will cause a pulse to be fed to solenoid 62 which will advance the wiper 60 to the number one contact of the switch. This will then cause the contacts 66 to open temporarily stopping the feeding of pulses to the solenoid 62 from line 63. Thereafter, pulsing of the solenoid 62 is controlled by a branch including contacts 70 controlled by the HR relay (not shown) of the switch 58 which contacts are closed when the switch 58 is away from its home position, and contacts 72 which are controlled by the off-normal typewriter 3. That is, whenever the typewriter finishes printing of a single digit, suitable mechanism found in conventional automatic typewriters operate to close momentarily directly or indirectly the contacts 72. One such typewriter is presently being manufactured under the name "Flexowriter" by the Commercial Controls Corporation. This completes a circuit extending from a source of positive voltage to the step solenoid 62 to advance the wiper 60 one position.

When the wiper 60 was in position number one, energizing voltage is fed from the wiper 60 to the wiper of the tens digit hours switch 55a via a line 71a to energize the input channel of the typewriter 4 which is connected to the stationary contact of the switch 55a which is contacted by the last mentioned wiper. Upon completion of the printing of the latter digit, the typewriter contacts 72 in the energization circuit of the step solenoid 62 are momentarily closed as above explained to pulse the solenoid 62 which advances the wiper to contact number two. This procedure continues until the wiper arms of the remaining switches of the digital time storage unit, and the wiper arms of the point identification unit 56 and the wiper arms of the switches 50, 52 and 54 are sequentially energized to activate the typewriter input for completion of the recording of the abnormal data. When the wiper arm 60 reaches the last contact 10 of the switch 58, the line 73 connected thereto is energized by the voltage on the wiper. The line 73 (see Fig. 2) connects to the feed line 33 leading to the step solenoid 30 of scanner 6a and shunts alarm contacts 34. However, the solenoid 30 does not actually advance the associated wiper until the pulsation is complete which occurs when the last digit is recorded and the wiper 60 of switch 58 is moved to its home position.

If another abnormal variable is detected, the aforementioned measuring and recording procedure is repeated. Otherwise, the scanner continuously and repeatedly scans all variables as long as contacts 31 in feed line 33 remain closed.

When the time arrives that it is desired to have the recording of all variables, a start pulse is generated automatically by a timer (not shown) or is initiated manually and this start pulse is fed to the step solenoid 37 of the print group control programmer 38 via line 74 to step the point group control switch to the next or number two position which controls measuring and recording of the first group of variables, in the example variables numbers one through 75. Advancement of the point group control switch away from the aforementioned first position de-energizes relay $R_1$ to open the contacts 31 in the feed line 33 of solenoid 30, and energizes relay $R_2$ connected to the #2 contact of switch 35 which closes contacts 76 in a line 77 extending from the last contact of the second or $S_2$ level of the scanner switch 6a. Referring to Figs. 2 and 4, this feeds a voltage on line L1, which is line L1a in Fig. 2, to the step solenoid of high speed partial scanner 6b. Thus, as the scanner 6a is returned to its home position, a pulse on line 77 is completed which operates solenoid 78 to move the associated wiper or wipers to their number one off-home contact position. Also, as the over-all high speed scanner 6a reaches its home position, the off-home contacts 36 in the feed line 33 open to terminate the operation of the scanning switch 6a.

The solenoid 78 has feed line 79 which extends from the high speed pulse line 32 and through contacts 80 controlled by the HR relay of scanner 6b which are closed for all wiper positions on the home position thereof. Upon closing of the off-home contacts 80, the scanner 6b is continuously pulsed until the scanner is returned to its home position whereupon the off-home contacts 80 open to break the feed to the step solenoid 78. The output of the scanner 6b is fed to the input of the high-low alarm detector 9. The alarm detector 9 is sequentially connected to the aforementioned memory elements now referred to by reference number 17a by a scanning switch 81 which is a second level of the scanner 6b. This level which has the same number of contacts as the scanner level 6a and operates in synchronism with the scanner 6b. If the value of the variable being scanned at any moment is abnormal, the alarm detector will be coupled to the associated memory or storage element forming part of box 17a to energize the same to store information on such abnormal variables.

The scanner 6a has a third transfer level like S2 in Fig. 4, and when the wiper W1' thereof moves from its last to its home position, a pulse is completed on line L1b feeding the step solenoid 82 of the low speed partial scanner 6c which controls feeding of the transducer voltages of variables #1 to #75 to the measuring and typewriter control circuit 12. The wiper of scanner 6c then advances from its home position to its first contact position which connects the transducer associated with variable #1 to a line 83 connecting with the main feed line 39 leading to the measuring circuit 40. The scanning switch 6c has an HR relay with contacts 84 in a feed line 85 leading to solenoid 82. The contacts 84 are closed for all positions of the wiper of scanner 6c except home position. The feed line 85 extends from a source of direct current voltage and through a set of contacts 86, then closed, which are controlled by the relay R2 of the points group control switch 35. Contacts 86 are closed when the wiper of the point group control switch 38 is in its #2 position. Another set of contacts 87 in the feed line 85 are provided which are operated by a relay to be referred to hereafter.

While a particular transducer is connected to the measuring circuit 40 during the low speed scanning cycle, the digit switches 50, 52 and 54 are positioned in the same manner previously described. The wipers 51, 53 and 57 of these switches are connected respectively to the stationary contacts of a regular print programmer stepping switch system 88. This stepping switch system has a very large number of stationary contacts preferably formed from a series of tandem connected stepping switches, although for simplicity sake a single step switch has been illustrated. For example, associated with each variable there are a group of three successive contacts, and the wiper arms of the switches 50, 52 and 54 are respectively connected to these contacts of each group. Associated with the third or last contact of each group is a relay 89 which, when energized, closes the contacts 87 in the feed line of the step solenoid 82 to advance the low speed partial scanner 6c one position.

The advancement of the wiper 90 of the programmer switch 88 is controlled by a step solenoid 91. Solenoid 91 is connected to a source of direct current potential through three parallel branch circuits. One of the branch circuits includes a single set of contacts 92 which are controlled by the HR relay of the high speed partial scanner 6b. These contacts 92 are closed momentarily only when the wiper of the high speed partial scanner 6b is returned to its home position. This pulses the solenoid 91 to advance the wiper 90 of the switch 88 from its 0 or home position to its number one position.

Connected to the number one contact are two groups of contacts 93a—94a and 93b—94b which respectively are in parallel with one another, these contacts being respectively controlled by sensing relays 17b and 18b respectively (see Fig. 2) associated with the memory circuits 17 and 18. The sensing relay 17b is sequentially connected by means of a scanning switch 17c, which may be a second level of low speed partial scanner 6c, to the corresponding storage element in the memory circuit 17a associated with the variable being scanned. If the memory or storage unit scanned indicates that the variable was abnormal when previously scanned, the sensing relay 17b will be energized which closes normally open contacts 93a. Wiper 90 is connected to a source of direct current potential and, where an abnormal variable is scanned, this potential is transferred through the closed contacts 93a to a red ribbon shift line X—R leading to a red ribbon shift terminal 2a on the typewriter 2. The typewriter 2 may include a latch type relay which is energized when the red ribbon shift terminal is connected to a source of direct current potential. A typewriter which operates on this principal is one manufactured under the trade name "Flexowriter" manufactured by Commercial Controls Corporation.

If the storage element to which the sensing relay 17b is connected indicates that the variable was just previously normal, then the wiper voltage is transferred through a set of normally closed contacts 93b of the sensing relay 17b leading to a line X—B connected to a terminal 2b of the typewriter 2. Energization of this terminal will unlatch the aforementioned typewriter relay if it was previously latched to provide regular black printing on the log sheet. Contacts 94a and 94b in parallel with contacts 93a and 93b are controlled by sensing relay 18b associated with the memory circuit 18 and operate in a similar manner to control the color of the printing. When either the red or the black terminals of the typewriter 2 are connected to a source of energizing potential, contacts 97 in a second branch line 98 associated with the step solenoid 91 are momentarily closed. This may be accomplished by a relay forming part of the typewriter 2. The contacts 97 are also momentarily closed by the typewriter 2 whenever the printing of a digit is completed. Also, in the branch 98 is a set of contacts 99 which are controlled by the HR relay (not shown in Fig. 2) of the print programmer switch 88, these contacts being off-home contacts which are closed only when the wiper 90 of the switch 88 is off the home or number 0 contact position.

As the typewriter contacts 97 momentarily close, and the solenoid is pulsed to advance the wiper to the number two contact position, the wiper 51 associated with the switch 50 is energized to transfer energizing voltage to the typewriter input channel of the typewriter 2 connected to the line X–0 . . . X–9 which is fed by the latter wiper. Connected in series with the input channels of the typewriter 2 and the lines X–0 to X–9 are contacts 28–0 to 28–9 which are controlled by relay $R_1$ of the point group control switch 38. Whenever the point group control switch is in a position other than the number 2 or number 3 position, the relay $R_1$ is de-energized and contacts 28–0 to 28–9 are closed. When relay $R_1$ is energized, the latter contacts are open to prevent operation of the typewriter 2. This occurs during the period when the over-all high speed scanner is operating. Thus, as each digit is printed, the typewriter switch 97 momentarily closes to further advance the wiper of the switch 88 whereupon numerical data of the hundreds, tens and units digits of the number corresponding to the value of the variable scanned is recorded. When the wiper reaches the last contact of the group associated with the variable being scanned, in the example now being described the #4 contact, the relay 89 connected thereto is energized and this closes the contacts 87 in the feed line 85 leading to the step solenoid 82 to initiate a pulsing operation. This pulsing is complete when the wiper 90 is advanced from the #4 contact thereof to the #5 contact, the first contact of the succeeding group of three contacts associated with the next variable. Then the solenoid 82 (Fig. 2) advances the wiper of scanner 6c one position to couple the transducer of the succeeding variable to the measuring circuit 40. The relay 89 is connected to the last contact of each group of three contacts of the switch 88 so that the above mentioned one step advancement of scanner 6c occurs for each three step advancement of wiper 90 of print programmer switch 88.

When the wiper 90 reaches the last contact of the print programmer 88, contact number 226 in the example where there are 75 variables scanned per group, relay 89 is again energized to initiate a pulsing of the step solenoid 82 of scanner 6c. A reset line 100 also connected to terminal number 226 is then energized to initiate a pulsation of the step solenoid 37 associated with the point group control switch 35. Line 100 is also connected to step solenoid 30 through off-home contacts 101 controlled by relay R, associated with the #1 contact of the point group control switch 37. The contacts 101 are closed when relay R1 is energized. This initiates the pulsation of 30. Upon completion of the printing of the last digit, typewriter contacts 97 of the energization circuit of the step solenoid 91 momentarily closes to step the print programmer 88 to its home position. This completes the pulsation of the step solenoids 30 and 37 which advances the wipers of the associated high speed scanner and point group control stepping switches 6a and 35 one position. Also, upon momentary closing of typewriter contacts 87, the wiper of scanner switch 6c is returned to its home contact position.

As the point group control switch is advanced to the last or #3 contact position, a relay $R_3$ connected thereto is energized and relay $R_2$ connected to contact #2 becomes deenergized. The contacts 86 and 76 of the latter open to render the scanner 6b and 6c inoperative. Energization of relay $R_3$ closes contacts 104 in a feed line 106 extending from transfer line L1a of the over-all high speed scanner 6a leading to step solenoid 102 which controls high speed partial scanner 6d. Energization of relay R₃ also closes contacts 86' in a branch 117 leading to step solenoid 115 associated with low speed scanner 6e. When the wiper of the print programmer 88 was returned to the home contact #0, the wiper of the over-all high speed scanner 6a was in its home position so that the aforementioned pulsing of the solenoid 30 by the pulse on line 100 will move the wiper away from the latter position to initiate another over-all scanning and monitoring cycle of all variables in the same manner described above upon the closing of off-home contacts 36.

When the wiper of scanner 6a is stepped to its home position again, the completed pulse on line L1a is fed to step solenoid 102 via closed contact 104 in branch 106. This advances the wiper of the scanning switch 6d away from its home position, and a scanning and recording sequence involving scanner 6d and 6e begins involving variables 76-150 which is identical to that explained above involving scanner 6b and 6c. Thus, associated with the high speed partial scanner 6d is a set of contacts 108 controlled by the HR relay thereof in a feed line 110 extending between the high speed pulse line 32 and the step solenoid 102. The contacts 108 are closed except when wiper of scanner 6d is in its home position. As the latter wiper advances from position to position, a slave scanner 112 which is another level of scanner 6d is similarly advanced to sequentially connect the alarm detector 9 to memory or storage units 18a associated with variables numbers 76 through 150.

As in the case of memory units 17a, whenever an abnormal variable is detected by the detector circuit 9, the memory unit is energized to store information on the abnormal variable. When the wiper of scanner 6d is in its home position, the contacts 108 open to break the feed line to its step solenoid 102. Also, when the wiper of the switch 6d arrives at the last contact position, a pulse is initiated which appears on the pulse line L1d associated with a third level of the scanner 6d which pulse is fed to the step solenoid 115 of the low speed partial scanner 6e. As the wiper of scanning switch 6d is moved into its home position, pulsing of step solenoid 115 is completed to effect the advancement of the wiper of the low speed partial scanner 6e.

Associated with the step solenoid 115 is a feed branch circuit 117 which corresponds with the feed branch circuit 85 of the low speed partial scanner 6c. Thus, this branch line includes contacts 87' which are closed each time the wiper 90 of the regular print programmer scanning switch 88 reaches the last of the contacts in each group of contacts associated with the respective variables. Also included in the branch circuit 117 are the aforementioned contacts 86' of point group control relay R₃ which closes the contacts 86' when the point group control switch is in its #2 contact position, and also a set of contacts 120 which are off-home contacts of the HR relay of the low speed partial scanner 6e which contacts are closed when the wiper of the latter switch is away from its home position. Variables numbers 76 through 150 are thus sequentially recorded through operation of the measuring circuit, the regular print programmer and the regular logging typewriter in the same manner previously explained in connection with the operation of scanning switch 6c. Initiation of the advancement of the wiper 90 of the regular print programmer switch 88 is, however, effected by a set of contacts 123 in the third branch circuit 125 associated with the step solenoid 91 of the regular print programmer 88. The contacts 123 are controlled by the HR relay of the high speed partial scanning switch 6d, and close only momentarily as the switch 6d moves from its last contact position to its home position. This initiates the operation of the print programmer scanner 88 whose wiper advances throughout its various contact positions in a manner above described to effect the printing of the variables 76-150 and the stepping of scanner 6e.

When the wiper of the print programmer reaches contact #226, a pulse is initiated on line 100 which pulses the step solenoid 37 of the point group control switch to return the wiper thereof to its #1 position and pulses the step solenoid 30 of the over-all high speed scanner 6a. Relay 89 associated with the print programmer 88 is also energized to initiate pulsing of the step solenoid 6e. The transfer pulsations are complete when the wiper arm 90 of the switch 88 returns to its home position. Then, the wipers of switches 35 and 6e are moved to their home positions and the over-all high speed scanner is moved away from home position to initiate another series of over-all high speed scanning operations of all variables. On return of the point group control switch 35 to its home position, contacts 31 in the feed line 33 to the step solenoid 30 of high speed scanner 6a close to effect a continuous and repeated advancement of the wiper of the scanner until the next start pulse on line 74 steps the point group control switch to the #2 position thereof. The system continues to operate in the manner above explained.

Resetting of the memory units 17a and 18a may be effected in any suitable manner. For example, a pulse can be derived from the low speed partial scanner 6e as it is homed to act as a resetting pulse for removing or terminating energization of the member units which were previously set to their abnormal conditions by the alarm detector 9.

The system above described thus provides on the regular log sheet 5 vertical columns of data on all variables regularly scanned, with abnormal variables being printed in red and normal variables printed in black. Also, abnormal data is grouped on the off-normal log sheet 3. As above explained, one of the primary advantages of the invention is that up to date information on abnormal variables is obtained on the log sheet 3 since all variables are scanned at a high speed at intervals or in the middle of the recording of all variables. Further, information on abnormal variables in the memory units 17a and 18a is effected during an interval when the measuring and recording apparatus is not in actual operation minimizing the possibility of false alarms due to the false triggering of the alarm detector.

It should be understood that the high-low alarm detector, memory units, and for that matter, all of the other elements shown in box form may be any one of a number of well known units of their type. The techniques for operating these elements are well known. The present invention brings together these various units in a novel and advantageous manner.

It is claimed as new and desired to be protected by Letters Patent of the United States:

1. Apparatus for monitoring and recording data on a number of variables comprising: a relatively high speed detecting means responsive to abnormal variables, relatively low speed recording means responsive to said variables, said recording means being adapted to segregate regularly scanned data on substantially all of said variables in a first record location and abnormal data scanned at other times in another record location, first scanning means for periodically successively feeding data on substantially all of said variables to said recording means at a relatively slow rate and in different respective groups during spaced recording intervals, said scanning means thereby scanning a different group of the variables during each of said recording intervals, said recording means recording said last mentioned data in said first record location, second scanning means for successively feeding data on all of said variables to said detecting means at a relatively high rate between each successive pair of said spaced recording intervals, and means responsive to the detection of an abnormal variable by said detecting means between said spaced recording intervals for temporarily stopping said second scanning means and effecting the coupling of data on the abnormal variable to said recording means, said recording means recording said abnormal data in said second record location.

2. Apparatus for monitoring and recording data on a number of variables comprising: detecting means responsive to abnormal variables, recording means adapted to segregate regularly scanned data on said variables in a first record location and abnormal data scanned at other times in another record location, first scanning means for regularly successively feeding data on said variables to said recording means in different respective groups thereof during spaced recording intervals, said scanning means thereby scanning a different group of the variables involved during each of said spaced recording intervals, said recording means recording data on said different groups of variables in said first record location, second scanning means for successively scanning data on all of said variable to said detecting means between each successive pair of spaced recording intervals, and means responsive to the detection of an abnormal variable by said detecting means between said spaced recording intervals for effecting the coupling of such abnormal variable data to said recording means, said recording means recording said abnormal data in said second record location.

3. Apparatus for monitoring and recording data on a number of variables comprising: detecting means responsive to abnormal variables, a relatively low speed measuring means responsive to said variables, recording means controlled by said measuring means for recording scanned data, scanning means for periodically successively feeding data on substantially all of said variables in different respective groups thereof to said measuring means during spaced recording intervals at a relatively slow rate, said scanning means thereby scanning a different group of the variables involved during each of said spaced recording intervals, scanning means for successively feeding data on all of said variables to said detecting means in the period between each pair of spaced recording intervals at a relatively high rate of speed, means responsive to the sensing of an abnormal variable by said detecting means between said spaced recording intervals for effecting the coupling of data on such abnormal variable to said measuring means and for rendering said recording means responsive to said measuring means during such detecting of abnormal variables, and means for rendering said recording means responsive to said measuring means during said spaced recording intervals.

4. Apparatus for monitoring and recording data on a number of variables comprising: a relatively high speed detecting means responsive to abnormal variables, a relatively low speed measuring means responsive to said variables, recording means controlled by said measuring means for recording scanned data, scanning means for successively feeding data on substantially all of said variables in different respective groups thereof to said measuring means during spaced recording intervals at a relatively slow rate, said scanning means thereby scanning a different group of the variables involved during each of said spaced recording intervals, scanning means for successively feeding data on all of said variables to said detecting means in the period between each pair of spaced recording intervals at a relatively high rate of speed, means responsive to the sensing of an abnormal variable by said detecting means between said spaced recording intervals for temporarily stopping said latter scanning means, means also responsive to said detecting means between said spaced intervals for effecting the coupling of data on such abnormal variable to said measuring means and for rendering said recording means responisve to said measuring means during such detecting of abnormal variables, and means for rendering said recording means responsive to said measuring means during said spaced recording intervals.

5. Apparatus for monitoring and recording data on a number of variables comprising: a relatively high speed detecting means responsive to abnormal variables, relatively low speed measuring means responsive to said variables, a first recording device controlled by said measuring means for recording data on variables scanned during regular spaced recording intervals, a second recording device controlled by said measuring means for recording and grouping data on abnormal variables scanned between said regular recording intervals, scanning means for successively feeding data on substantially all of said variables to said measuring means in different respective groups during said spaced recording intervals at a relatively slow rate, said scanning means thereby scanning a different group of the variables involved during each of said spaced recording intervals, said first recording device being responsive to said measuring means during said regular recording intervals, scanning means for successively feeding data on all of said variables to said detecting means in the period between each pair of spaced recording intervals, at a relatively high rate of speed, means responsive to the sensing of an abnormal variable by said detecting means between said spaced recording intervals for temporarily stopping said latter scanning means, and means responsive to said detecting means between said spaced recording intervals for effecting the coupling of data on such abnormal variable to said measuring means and for rendering said second recording device responsive to said measuring means during such detecting of abnormal variables.

6. Apparatus for monitoring and recording data on a number of variables comprising: detecting means responsive to abnormal variables, measuring means responsive to said variables, a first recording device controlled by said measuring means for recording data on variables scanned during regular spaced recording intervals, a second recording device controlled by said measuring means for recording and grouping data on abnormal variables scanned between said spaced recording intervals, scanning means for successively feeding data on substantially all of said variables to said measuring means in different respective groups thereof during said spaced recording intervals scanning means for successively feeding data on all of said variables to said detecting means in the period between each pair of spaced recording intervals, means responsive to the sensing of an abnormal variable by said detecting means between said spaced recording intervals for effecting the coupling of data on such abnormal variable to said measuring means and for rendering said second recording device responsive to said measuring means during such detecting of abnormal variables, and means for rendering said first recording device responsive to said measuring means during said spaced recording intervals.

7. Apparatus for monitoring and recording the values of variables as determined by the output of primary measuring devices associated with the respective variables comprising: detecting means respective to the abnormal output of said primary measuring devices, memory means for storing information on which variables are abnormal as detected by said detecting means, measuring means responsive to said primary measuring devices, recording means controlled by said measuring means to record data on the values of the variables, scanning means for sequentially coupling said primary measuring devices to said detecting means and to said measuring means, means for repeatedly operating said scanning means at a relatively high scanning rate during spaced scanning intervals to scan rapidly the output of said primary measuring devices, means for rendering the detecting means operative to respond to the output of said devices during said high speed scanning intervals and preventing operation of said recording means by said measuring means during the same, means for operating said scanning means at a relatively low rate following each of said high speed scanning intervals to rescan the primary measuring devices associated with the variables scanned during the preceding high speed scanning interval, means for rendering said measuring means operative to cause said recording means to record the values of said variables during said rescanning operations, and means associated with said recording means and responsive to said memory means associated with said detecting means for providing a distinguishing characteristic to the recorded data associated with the variables which were abnormal during the previous high speed scanning interval.

8. Apparatus for monitoring and recording the values of variables as determined by the output of primary measuring devices associated with the respective variables comprising: detecting means responsive to the abnormal output of said primary measuring devices, memory means for storing information on which variables are abnormal as detected by said detecting means, measuring means responsive to said primary measuring devices, recording means controlled by said measuring means to record data on the values of the variables scanned, scanning means for sequentially coupling said primary measuring devices to said alarm detecting means and to said measuring means, means for repeatedly operating said scanning means during spaced scanning intervals to scan the output of said primary measuring devices, means for rendering the detecting means operative to respond to the output of said devices during said scanning intervals and preventing operation of said recording means by said measuring means during the same, means for operating said scanning means following each of said scanning intervals to rescan the primary measuring devices associated with the variables scanned during the preceding scanning interval, means for rendering said measuring means operative to cause said recording means to record the values of said variables during said rescanning operations, and means associated with said recording means and responsive to said memory means associated with said detecting means for providing a distinguishing characteristic to the recorded data associated with the variables which were abnormal during the previous scanning interval.

9. Apparatus for monitoring and recording the values of variables as determined by the output of primary measuring devices associated with the respective variables comprising: alarm detecting means responsive to the abnormal outputs of said primary measuring devices, memory means for storing information on which variables are abnormal as detected by said detecting means, measuring means responsive to said primary measuring devices, recording means controlled by said measuring means to record data on the values of the variables scanned, scanning means for sequentially coupling said primary measuring devices to said detecting means and to said measuring means, and programming means for controlling the speed and order in which said scanning means connects said primary measuring devices to said detecting means and measuring means comprising means for operating said scanning means at a relatively high scanning rate during space scanning intervals to scan rapidly the outputs of different respective groups of said primary measuring devices so that over said spaced intervals of time all of said variables are scanned once, means for rendering the alarm detecting means operative to respond to the output of said scanning means during said high speed scanning intervals and preventing operation of said recording means by said measuring means during the same, means for operating said scanning means at a relatively low rate immediately following each of said high speed scanning intervals to respectively rescan the primary measuring devices associated with the group of variables scanned during the immediately preceding high-speed scanning interval, means for rendering said measuring means operative to cause said recording means to record the values of all of said different respective groups of variables during said rescanning operations, and means associated with said recording means and responsive to said memory means associated with said detecting means for providing a distinguishing characteristic to the recorded data associated with the variables which were abnormal during the previous high speed scanning interval.

10. Apparatus for monitoring and recording the values of variables as determined by the output of primary measuring devices associated with the respective variables comprising: detecting means responsive to the abnormal outputs of said primary measuring devices, memory means for storing information on which variables are abnormal as detected by said detecting means, measuring means responsive to said primary measuring devices, recording means controlled by said measuring means to record data on the values of the variables scanned, scanning means for sequentially coupling said primary measuring devices to said detecting means and to said measuring means, and programming means for controlling the speed and order in which said scanning means connects said primary measuring devices to said detecting means and measuring means comprising means for operating said scanning means during spaced scanning intervals to scan the output of different respective groups of said primary measuring devices so that over said spaced intervals of time all of said variables are scanned once, means for rendering the detecting means operative to respond to the output of said scanning means during said scanning intervals and preventing operation of said recording means by said measuring means during the same, means for operating said scanning means immediately following each of said scanning intervals to respectively rescan the primary measuring devices associated with the group of variables scanned during the immediately preceding scanning interval, means for rendering said measuring means operative to cause said recording means to record the values of all of said different respective groups of variables during said rescanning operation and means associated with said recording means and responsive to said memory means associated with said detecting means for providing a distinguishing characteristic to the recorded data associated with the variables which were abnormal during the previous high speed scanning interval.

11. Means for monitoring and recording the values of a large number of variables comprising: detecting means for comparing the value of a variable being monitored with a predetermined standard for that variable, respective memory means responsive to said detecting means for memorizing which variables were previously abnormal, measuring and recording means which operate more slowly than said detecting means, means for sequentially feeding data signals on the variables to said detecting means and said measuring means, and programming means for controlling the order and speed in which said variables are scanned and the order in which said detecting means and measuring means are rendered operative, said programming means comprising means for operating said scanning means to scan a limited number of said variables at a high scanning rate for abnormal variables, means operative during said high speed scanning operation for rendering the detecting means and memory responsive to the scanned data by memorizing which variables were abnormal and for rendering said measuring and recording means non-responsive to the scanned data, means operative following the above-mentioned high speed scanning operation for operating the scanning means to rescan said limited number of variables at a relatively low rate of speed, means for rendering said measuring means operative to cause said recording means to record the values of the variables rescanned, means associated with said recording means and responsive to said memory means for providing a distinguishing characteristic to the data on abnormal variables, means operative following said last-mentioned low speed scanning operation for operating the scanning means to scan all variables for abnormal variables at a high rate of speed, means for rendering said detecting means responsive to the scanned data during said over-all high speed scanning operation and for rendering said measuring and recording means non-responsive to the scanned data during the same, means responsive to an abnormal variable sensed by said detecting means for temporarily rendering said measuring and recording means operative to record data on the abnormal variable and for temporarily stopping said scanning means, all of said means being operative following said last-mentioned over-all scanning of the variables to repeat the same sequence of limited scanning and recording operations for a different group of variables and to follow this with said over-all high-speed scanning operation.

12. Apparatus for monitoring and recording a number of variables comprising: relatively slow operating recording means for recording the conditions of the variables, relatively fast operating detecting means responsive to data signals indicating abnormal values of said variables, means for periodically sequentially feeding variable condition signals on each of said variables once at a relatively slow rate to said recording means, means for frequently interrupting the feeding of said signals to said recording means during each recording period, means for rapidly feeding variable condition signals on all of said variables to said detecting means during each interruption, the variables being thus frequently scanned for abnormal variables despite the relatively long period required to record all of said variables once each recording cycle, and the feeding of variable condition signals on one or more variables whose conditions have not been recorded during the recording period involved being thus resumed after each said interruption, and means including means responsive to the detection of an abnormal condition of the variables for indicating the abnormal conditions of the variables involved.

13. Apparatus for monitoring and recording the values of variables comprising: means for providing data signals representing the conditions of respective variables whose conditions are to be monitored and recorded, recording means responsive to said data signals for recording data on the variables, detecting means responsive to data signals indicating abnormal variables, memory means for storing information on which variables are abnormal, means for first sequentially coupling said data signals to said detecting means, said recording means then being non-responsive to said signals, means responsive to said detecting means for storing in said memory means information on which of said variables were abnormal, means immediately following said coupling of said data signals to said detecting means for sequentially feeding data signals on the same variables to said recording means for recording, and means associated with said recording means and responsive to abnormal information on said variables stored in said memory means for indicating which of the data recorded by said recording device is abnormal data.

References Cited in the file of this patent

UNITED STATES PATENTS

| | | |
|---|---|---|
| 2,564,294 | Belcher | Aug. 14, 1951 |
| 2,701,748 | Anderson | Feb. 8, 1955 |
| 2,712,128 | Woodruff | June 28, 1955 |
| 2,830,865 | Meadows et al. | Apr. 15, 1958 |